UNITED STATES PATENT OFFICE.

GEORGE A. RICHTER, OF BERLIN, NEW HAMPSHIRE, ASSIGNOR TO BROWN COMPANY, OF BERLIN, NEW HAMPSHIRE, A CORPORATION OF MAINE.

METHOD OF MAKING CALCIUM-BISULFITE COOKING LIQUOR.

1,378,617.  Specification of Letters Patent.  Patented May 17, 1921.

No Drawing.   Application filed September 5, 1919.  Serial No. 321,975.

*To all whom it may concern:*

Be it known that I, GEORGE A. RICHTER, a citizen of the United States, residing at Berlin, in the county of Coos and State of New Hampshire, have invented new and useful Improvements in Methods of Making Calcium-Bisulfite Cooking Liquor, of which the following is a specification.

This invention relates to a process for making calcium bisulfite cooking acid for the production of chemical wood pulp. In the ordinary bisulfite systems now in operation, two types of chemicals are used for the basic constituents of the acid sulfite liquor. The acid liquor is prepared either from limestone rock or slaked lime. Each of these sources for calcium in the finished acid liquor has its advantages and its disadvantages.

In the limestone systems, towers are used within which the limestone is stacked in chunks, ranging from six to thirty inches in diameter. Water is trickled down over the rock, and sulfur dioxid burner gas is allowed to pass up through the tower. In this way, the $SO_2$ from the burner gas is absorbed. The liquor, leaving the bottom of the tower, contains calcium bisulfite and a certain amount of free $SO_2$ in solution.

In the slaked lime or milk of lime systems, milk of lime is prepared by mixing slaked calcium oxid with water, producing calcium hydroxid in suspension in water. This material is delivered through a series of tanks, according to one process, sulfur dioxid gas being passed in the opposite direction. The finished bisulfite liquor is delivered from the bottom of these tanks, whereas the vent gases freed from $SO_2$ leave the top of the system.

Both of these methods, thus referred to, of making bisulfite liquor aim to produce a uniform acid, which is to be used for cooking wood, but the limestone rock system fails of its purpose. It is desirable to maintain uniformity in the combined acid content and at the same time to obtain as high a free $SO_2$ content as possible. The amount of free $SO_2$ which may be taken up by the liquor depends upon the $SO_2$ content in the burner gas, the gas pressure within the system, and the temperature of the outgoing liquor. Assuming that the strength of burner gas and pressure within the system are established, the temperature of the exit liquor is of extreme importance. Thermo chemical calculations show that the heat of reaction of calcium carbonate, reacting with an $SO_2$ solution, is about one-half of that realized by the reaction of calcium hydroxid and $SO_2$ solution, in making the same quantity of finished acid. It is, therefore, desirable to use calcium carbonate, inasmuch as the resultant liquor will be much cooler, and consequently contain more free sulfur dioxid.

The advantage of obtaining a low temperature liquor with the tower system, however, is somewhat offset by the fact that it is much more difficult to control the per cent. of calcium in solution, due to the fact that, with varying surfaces of rock exposed, the rate of reaction is changed considerably. Moreover the type of limestone used (*i. e.* whether a calcium limestone or a dolomite limestone) is a serious factor when the surface exposed to reaction is comparatively small. The temperature of the entrance water is also a serious factor in the rate of solution of calcium rock in sulfur dioxid. The calcium hydroxid, or milk of lime system, however, allows an accurate control of the calcium content of the finished liquor, but, on the other hand, produces a warmer finished acid, resulting in a lower free $SO_2$ content.

This invention comprises the use of finely divided or pulverized limestone in the production of calcium bisulfite liquor. This pulverized limestone may be used in the form of slurry or a thick suspension in much the same way as calcium hydroxid is at present employed. Being in this finely divided state, it reacts immediately with the $SO_2$ in the acidulated water, producing a comparatively cold acid with a desired or predetermined combined calcium content. This finely divided limestone, however, may be employed in either a tower or a tank type of system. Either the calcium rock or a dolomite rock may be used, inasmuch as there is no appreciable difference in reaction rate.

It is therefore quite immaterial whether the pulverized limestone, or calcium carbonate, be mixed with water to produce a thick suspension, before it is brought into the presence of water acidulated with sulfur dioxid, or whether it is fed in a dry state into a tank containing the acidulated water, or whether into a thin limestone suspension the sulfur dioxid is bubbled.

It is evident that, in any event, it is possible so to regulate the proportions of water, sulfur dioxid and pulverized calcium carbonate delivered to the reaction chamber to produce a calcium bisulfite cooking liquor having any commercially desirable predetermined contents of combined sulfur dioxid and free acid. That is, the gas delivered for reaction with the pulverulent material, in the presence of water, is so regulated that its proportion is greater than required merely for the formation of calcium bisulfite, so that the resultant solution is rich in free acid.

The pulverized mass is preferably produced by grinding limestone or dolomite rock to a finely divided or pulverulent state, capable say of passing through a sieve of 150 to 200 mesh.

Limestone (including dolomite and magnesite, according to its source) contains variable quantities of magnesium carbonate, which forms a valuable component in the making of a cooking acid. It frequently happens that much trouble is experienced by reason of the formation of sulfates either in the manufacture of the acid or in the digestion of the wood. Calcium sulfate is practically insoluble, being even more insoluble in hot water than in cold water, whereas magnesium sulfate is soluble in both hot and cold water. Now, during the cooking of the raw material in the manufacture of sulfite pulp, there is always present a certain quantity of sulfate, due to accidental oxidation in the burner gas and in the raw acid system. When the cooking acid contains only calcium as a base, there is formed, during the cooking operation, insoluble sulfate, which precipitates upon the fibers, and often results in difficulty in the subsequent bleaching operation. Whereas, if there is a sufficient quantity of magnesium present in the cooking liquor, there is a tendency for the calcium sulfate to react with the magnesium, and thus to eliminate, to a certain extent, the precipitation of calcium sulfate upon the fibers.

For these reasons, I employ crushed or finely-divided limestone, by which term I mean to include dolomite limestone, calcite rock and other forms of limestone containing more or less magnesium carbonate.

What I claim is:—

1. The herein described process of making a calcium bisulfite solution, which comprises pulverizing limestone containing magnesium and calcium carbonate, and causing a reaction between such pulverulent material, water and sulfur dioxid.

2. The herein described process of making a calcium bisulfite cooking liquor with a predetermined content of combined acid and free acid, which comprises pulverizing limestone, and causing a reaction in the presence of water, between such material and sulfur dioxid in excess of that required for the formation of calcium bisulfite.

3. The herein described process of making a calcium bisulfite cooking liquor with a predetermined content of combined acid and free acid, which comprises pulverizing limestone to pass through a sieve of 150 to 200 mesh, and causing such material to react in the presence of water with an excess of sulfur dioxid.

4. The herein described process of making a calcium bisulfite cooking liquor with a predetermined content of combined acid and free acid, which comprises pulverizing limestone to pass through a sieve of 150 to 200 mesh, forming a suspension of such material and water, and causing the reaction therewith of sulfur dioxid, either free or dissolved in water, in excess of that required for the formation of calcium bisulfite.

In testimony whereof I have affixed my signature.

GEORGE A. RICHTER.